Jan. 12, 1937. L. D. FOLEY 2,067,482
SHOCK ABSORBER
Filed Feb. 11, 1936
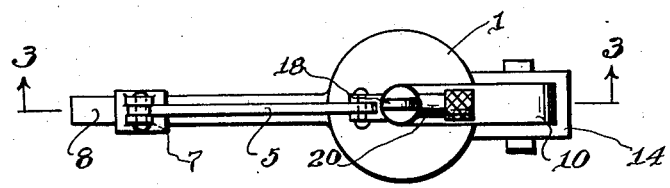
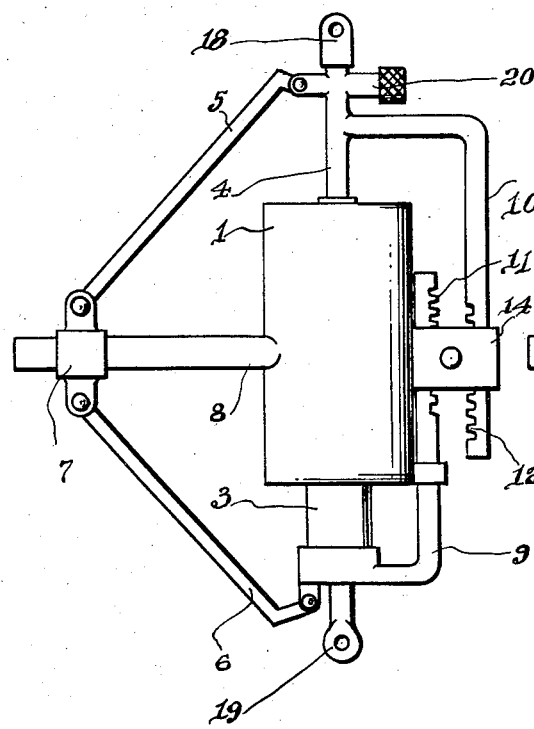
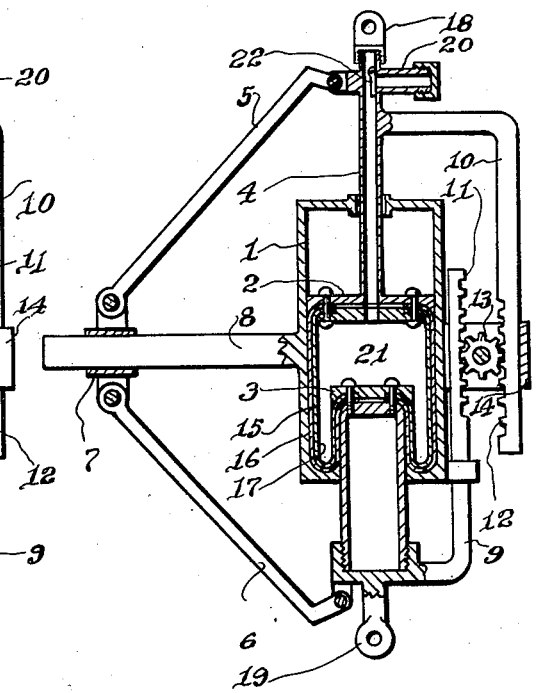
Inventor
Louis D. Foley
By J. Kaplan
Attorney Patented Jan. 12, 1937

2,067,482

UNITED STATES PATENT OFFICE 2,067,482

SHOCK ABSORBER

Louis D. Foley, Louisville, Ky.

Application February 11, 1936, Serial No. 63,410

7 Claims. (Cl. 267—65)

This invention relates to shock absorbers and more particularly to a packless shock absorber of the pneumatic type.

The main object of the invention is to provide a packless shock absorber having oppositely moving pistons which movement is adapted to be cushioned by gas or air contained in an enclosed chamber.

A further object of the invention is to arrange the pistons so they will move exactly the same distance from a common center to or from each other.

A still further object of the invention is to provide a stationary outer chamber with two oppositely moving pistons within said chamber, said pistons joined together with flexible tubing to provide an air tight inner cylinder and means to inflate the inner chamber.

A still further object of the invention is to connect the ends of both of the pistons to a linkage mechanism for keeping the travel of both of the pistons uniform.

Other objects will appear as the disclosure progresses. The drawing is intended to merely indicate a possible embodiment of the invention. It is obvious that the actual needs of manufacture may necessitate certain mechanical changes. It is therefore not intended to limit the invention to the embodiment illustrated but rather to define such limits in the appended claims. For a more general understanding of the invention attention is called to the drawing in which like reference characters denote like parts throughout the specification.

In the drawing:

Figure 1 is a top view of the device.

Figure 2 is a side view thereof and

Figure 3 is a section on line 3—3 of Figure 1.

Referring now to the drawing in detail, numeral 1 designates the outer casing, 2 the upper piston and 3 the lower piston. Leading from the upper piston and extending outwardly of the casing is a hollow tube 4. The lower piston extends outwardly of the casing and pivoted to the lower end thereof and the upper end of the hollow tube are links 5 and 6. The outward ends of the said links are pivotally attached to a sleeve 7 slidably mounted on the outwardly extending horizontal arm 8 attached to the casing 1. Attached to the lower end of the lower piston and the upper end of the tube 4 are vertical arms 9 and 10 provided with gear teeth 11 and 12 at their extremities. Meshing with these teeth is a gear 13 mounted in the bearing 14 attached to the outer casing.

Fastened to the upper and lower pistons 2 and 3 is a short length of flexible tubing 15 made of two thicknesses of material 16 and 17. At the extreme ends of the tubing 4 and the piston 3 are eyes 18 and 19. Leading to the interior of the tube is an inlet pipe 20 for admitting the gas or air in the chamber 21. A check valve 22 is provided to prevent any air from accidentally leaving the said chamber.

In operation when using the device as a shock absorber for vehicles the upper eye 18 is attached to the chassis of the vehicle and the lower eye 19 to the axle thereof. The device can be used in conjunction with the regulation springs or can be used in lieu thereof. The road shock of the automobile transmitted to the device will cause the two pistons 2 and 3 to move to each other and compress the air or gas within the chamber 21 and cushion the shock. When shock has spent itself the pistons will move back to their original position.

The travel of the pistons is uniform due to the gearing mechanism 11, 12 and 13 and the double linkage construction 15 and 16. For instance when the piston 2 moves down the piston 3 will move up the same amount and vice versa for the reason that at one side of the device the arms 9 and 10 are geared to the same gear 13 and at the opposite side of the device, the links 5 and 6 are linked to the one sleeve 7. For instance when the tube 4 is moved up the sleeve 7 will slide to the right of the link 5. This movement will cause the other link 6 to move the piston 3 down or in the opposite direction to the piston 2.

It will thus be seen that I have provided an efficient, practical and useful device to absorb the road shocks of vehicles or for any other like purpose. By filling up the chamber 21 with a fluid, removing the check valve 22 and connecting the inlet pipe 20 to a reservoir or to any other piece of mechanism, the shock or force developed by the pistons moving against each other can be transmitted to said reservoir or other mechanism. Due to the oppositely arranged gearing and linkage mechanism the pistons will travel in a perfectly vertical axis and thus avoid unnecessary friction.

As noted in Figure 3 the hose bears continuously against the walls of the cylinders thereby taking up all the shocks the hose being used merely to make the chamber 21 leak-tight. The lower inside end of the casing is curved in order to allow the hose to bend at a relatively large radius and prevents any undue friction and kinks in the hose and also to cause the hose to more readily and fully bear against the walls.

Having described my invention, I claim:

1. In a device of the class described, a casing, two oppositely moving pistons within said casing, a flexible hose connecting said pistons and forming an air tight chamber between said pistons, and means to cause said pistons to move to and from each other uniformly, said means comprising an arm associated with each of said pistons with the extremities of both of said arms meshed to one gear, said hose bearing against the inside of said casing and the outside of one of said pistons, the inside of the bottom of the casing having a curved portion to cause the hose to bend at a substantial large radius.

2. In a device of the class described, a casing, two oppositely moving pistons within said casing, a flexible hose connecting said pistons and forming an air tight chamber between said pistons, and means to cause said pistons to move to and from each other uniformly, said means comprising an arm associated with each of said pistons with the extremities of both of said arms meshed to one gear.

3. In a device of the class described, a casing, two oppositely moving pistons within said casing, a flexible hose connecting said pistons and forming an air tight chamber between said pistons, and means to cause said pistons to move to and from each other uniformly, said means comprising an arm extending outwardly of said casing, a sleeve slidably mounted on said arm, and two link members, one end of each link member pivotally connected to said sleeve and the other end of each of said link members pivotally associated with said pistons.

4. In a device of the class described, a casing, two oppositely moving pistons within said casing, a flexible hose connecting said pistons and forming an air tight chamber between said pistons, and means to cause said pistons to move to and from each other uniformly, said means comprising an arm associated with each of said pistons with the extremities of both of said arms meshing with one gear, an arm extending outwardly of said casing, a sleeve slidably mounted on said arm, and two link members, one end of each link member pivotally connected to said sleeve and the other end of each of said link members pivotally associated with said pistons.

5. In a device of the class described, a casing, two oppositely moving pistons within said casing, a flexible hose connecting said pistons and forming an air tight chamber between said pistons, a hollow tube leading from one of said pistons and extending above said casing, the other one of said pistons extending outwardly of said casing, an arm attached to said hollow tube and to the last mentioned piston, the extremities of said arms being parallel to each other and provided with gear teeth, a single gear meshing with the teeth of said arms, and an inlet pipe for admitting a compressive element within said chamber.

6. In a device of the class described, a casing, two oppositely moving pistons within said casing, a flexible hose connecting said pistons and forming an air tight chamber between said pistons, a hollow tube leading from one of said pistons and extending above said casing, the other one of said pistons extending outwardly of said casing, an arm attached to said hollow tube and to the last mentioned piston, the extremities of said arms being parallel to each other and provided with gear teeth, a single gear meshing with the teeth of said arms, an arm extending outwardly of said casing, a sleeve slidably mounted on said arm, two link members, one end of each link member pivotally connected to said sleeve and the other end of each of said link members pivotally associated with said pistons, and an inlet pipe for admitting a compressive element within said chamber.

7. In a device of the class described, a casing, two oppositely moving pistons within said casing, a flexible hose connecting said pistons and forming an air tight chamber between said pistons, and means to cause said pistons to move to and from each other uniformly, said means comprising an arm associated with each of said pistons with the extremities of both of said arms meshed to one gear, said hose bearing against the inside of said casing and the outside of one of said pistons, the inside of the bottom of the casing having a curved portion in order to cause the hose to bend at a substantial large radius, an arm extending outwardly of said casing, a sleeve slidably mounted on said arm, and two link members, each of said link members pivotally connected to said sleeve and the other end of each of said link members pivotally associated with said pistons.

LOUIS D. FOLEY.